US012399540B2

(12) United States Patent
Kinoshita et al.

(10) Patent No.: US 12,399,540 B2
(45) Date of Patent: Aug. 26, 2025

(54) ELECTRONIC APPARATUS

(71) Applicant: LENOVO (SINGAPORE) PTE. LTD., Singapore (SG)

(72) Inventors: Hiroaki Kinoshita, Yokohama (JP); Takayuki Morino, Yokohama (JP); Yalu Liu, Yokohama (JP); Daisuke Takahashi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 175 days.

(21) Appl. No.: 18/508,451

(22) Filed: Nov. 14, 2023

(65) Prior Publication Data

US 2024/0211004 A1 Jun. 27, 2024

(30) Foreign Application Priority Data

Dec. 22, 2022 (JP) .................................. 2022205799

(51) Int. Cl.
*G06F 1/16* (2006.01)
(52) U.S. Cl.
CPC .................................. *G06F 1/1681* (2013.01)
(58) Field of Classification Search
CPC .......... G06F 1/183; G06F 1/203; G06F 1/206; H05K 7/1422; H05K 7/20454; H05K 7/20472; H05K 7/205
See application file for complete search history.

(56) References Cited

U.S. PATENT DOCUMENTS

| | | | | |
|---|---|---|---|---|
| 10,469,638 B2* | 11/2019 | Chiba | ................. | H04M 1/0262 |
| 2019/0354148 A1* | 11/2019 | Delano | .................... | G06F 1/203 |
| 2022/0317741 A1* | 10/2022 | Cavallaro | ............... | G09F 9/301 |
| 2025/0043926 A1* | 2/2025 | Jiang | ....................... | F21V 23/02 |
| 2025/0089189 A1* | 3/2025 | Mao | .................... | H05K 7/20963 |
| 2025/0219380 A1* | 7/2025 | Isoda | .................. | B60R 16/0215 |

FOREIGN PATENT DOCUMENTS

| | | |
|---|---|---|
| JP | 2021015522 A | 2/2021 |
| JP | 2022121092 A | 8/2022 |

* cited by examiner

*Primary Examiner* — Anthony Q Edwards
(74) *Attorney, Agent, or Firm* — SHIMOKAJI IP (57) ABSTRACT

An electronic apparatus includes the first chassis and the second chassis which are relatively and rotatably connected, a flexible board provided astride between the first chassis and the second chassis, and a graphite sheet stacked on the flexible board. The flexible board and the graphite sheet have a substantially S-shaped extra length absorption portion formed in at least one of the first chassis and the second chassis and having a first folding portion and a second folding portion which are curved in directions opposite to each other, are fixed to each other at a front and rear of the extra length absorption portion, and are fixed to each other at an intermediate portion between the first folding portion and the second folding portion, excluding the first folding portion and the second folding portion, by an adhesive tape.

5 Claims, 8 Drawing Sheets

ELECTRONIC APPARATUS

BACKGROUND OF THE INVENTION

Field of the Invention

The present invention relates to an electronic apparatus in which a first chassis and a second chassis are rotatably connected.

Description of the Related Art

In recent years, electronic apparatuses such as PCs and smartphones that have a touch panel type liquid crystal display and do not have a physical keyboard are rapidly spreading. This type of display of the electronic apparatus is desired to be large when in use, but it is desired to be small when not in use. Therefore, an electronic apparatus configured such that the chassis can be folded by using a flexible display such as organic Electro Luminescence (EL) has become practical (see, for example, Japanese Unexamined Patent Application Publication No. 2021-015522).

Moreover, in a case in which the amount of information transmitted and received between the chassis is large or the like, and when the general wiring becomes too thick, it is conceivable to use a flexible board. Since the wiring between the chassis is extended or contracted due to a difference in peripheral length during a rotation operation, in Japanese Unexamined Patent Application Publication No. 2022-121092, a substantially S-shaped folding portion is provided on the flexible board to absorb a change in path length due to rotation of the chassis.

SUMMARY OF THE INVENTION

Meanwhile, when the S-shaped folding portion is provided on the flexible board, the S shape is slightly changed because the path length is absorbed according to the rotation of the first chassis and the second chassis, but in this case, there is a concern that abnormal noise occurs depending on an arrangement aspect of the flexible board.

The present invention has been made in view of the above problems, and an object of the present invention is to provide an electronic apparatus capable of suppressing occurrence of abnormal noise from a flexible board and components accompanying the flexible board due to rotation of the first chassis and the second chassis.

An electronic apparatus according to an aspect of the present invention, in which a first chassis and a second chassis are relatively and rotatably connected by a hinge, the electronic apparatus includes: a flexible board provided astride between the first chassis and the second chassis; and a sheet provided astride between the first chassis and the second chassis together with the flexible board while being stacked on the flexible board, in which the flexible board and the sheet have a substantially S-shaped extra length absorption portion formed in at least one of the first chassis and the second chassis and having a first folding portion and a second folding portion which are curved in directions opposite to each other, are fixed to each other at a front and rear of the extra length absorption portion, and are fixed to each other at an intermediate portion between the first folding portion and the second folding portion, excluding the first folding portion and the second folding portion.

The above-described aspect of the present invention can suppress occurrence of abnormal noise from a flexible board and components accompanying the flexible board due to rotation of the first chassis and the second chassis.

DETAILED DESCRIPTION OF THE INVENTION

Hereinafter, an embodiment of an electronic apparatus according to the present invention will be described in detail based on the drawings. It should be noted that the present invention is not limited to the embodiment.

Figure 1:
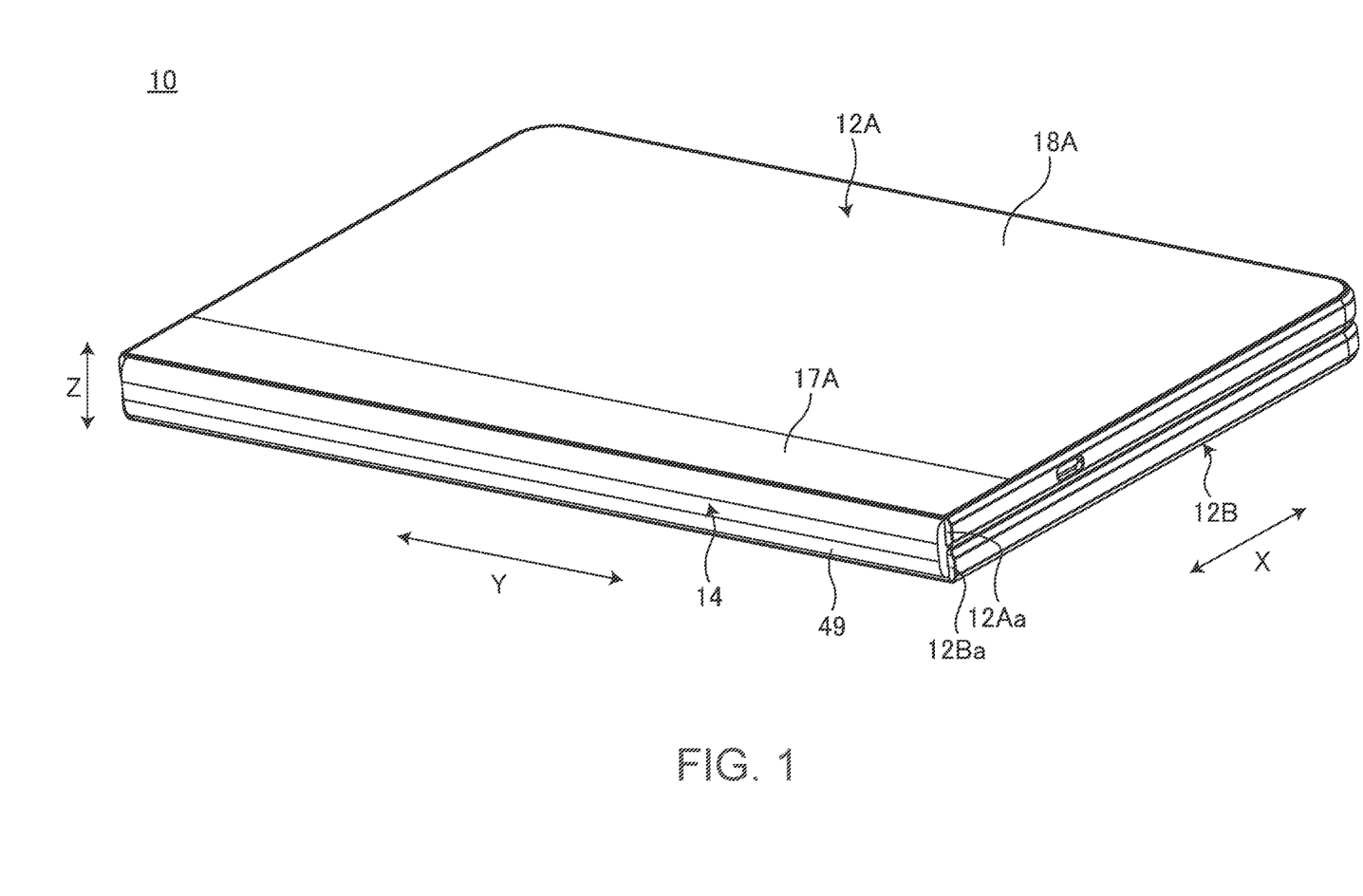
FIG. 1 is a perspective view illustrating a state in which an electronic apparatus according to an embodiment is closed and in a 0-degree posture.
Figure 2:
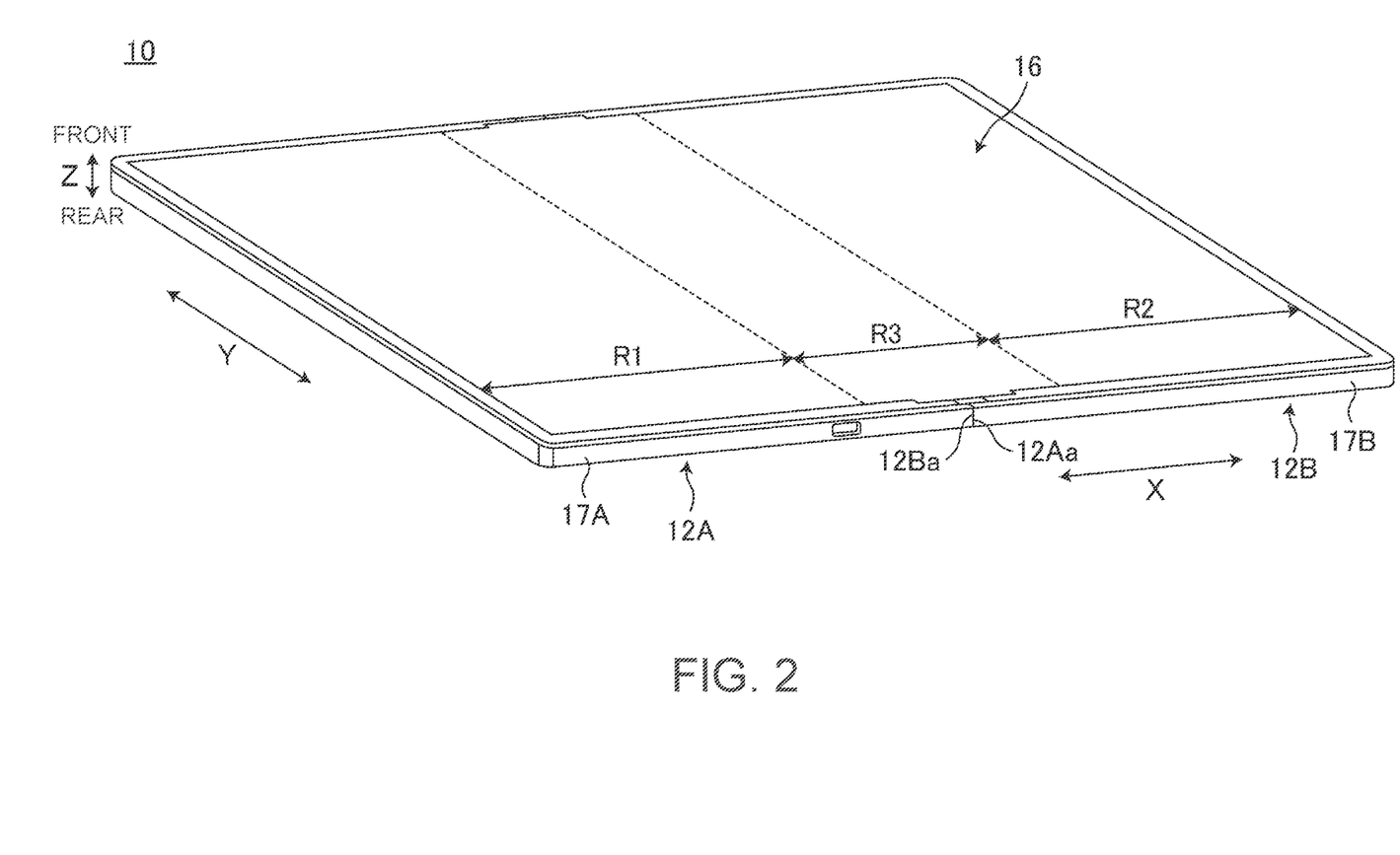
FIG. 2 is a plan view schematically illustrating a state in which the electronic apparatus is opened and in a 180-degree posture.
Figure 3:
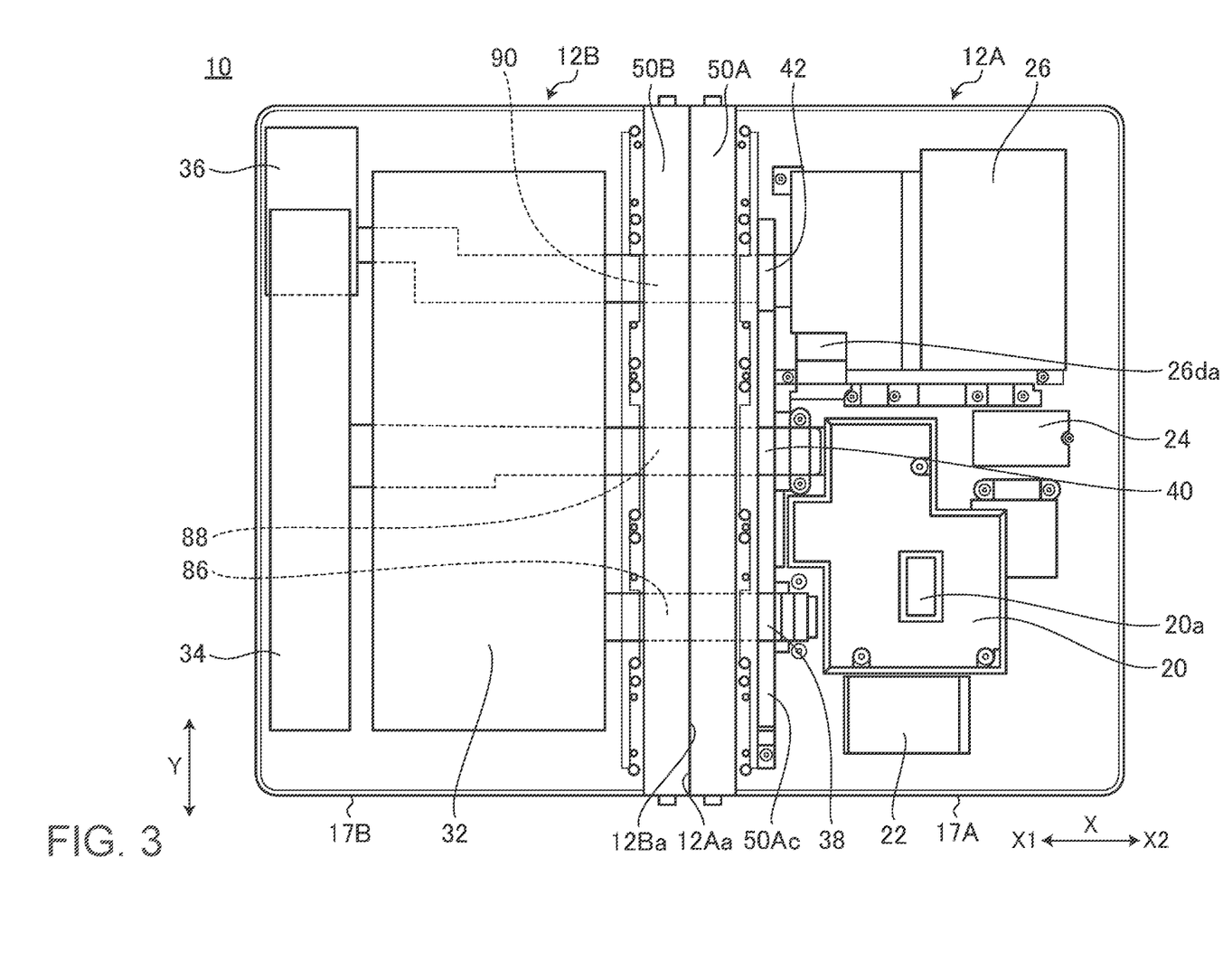
FIG. 3 is a plan view schematically illustrating an internal structure of the electronic apparatus.
Figure 4:
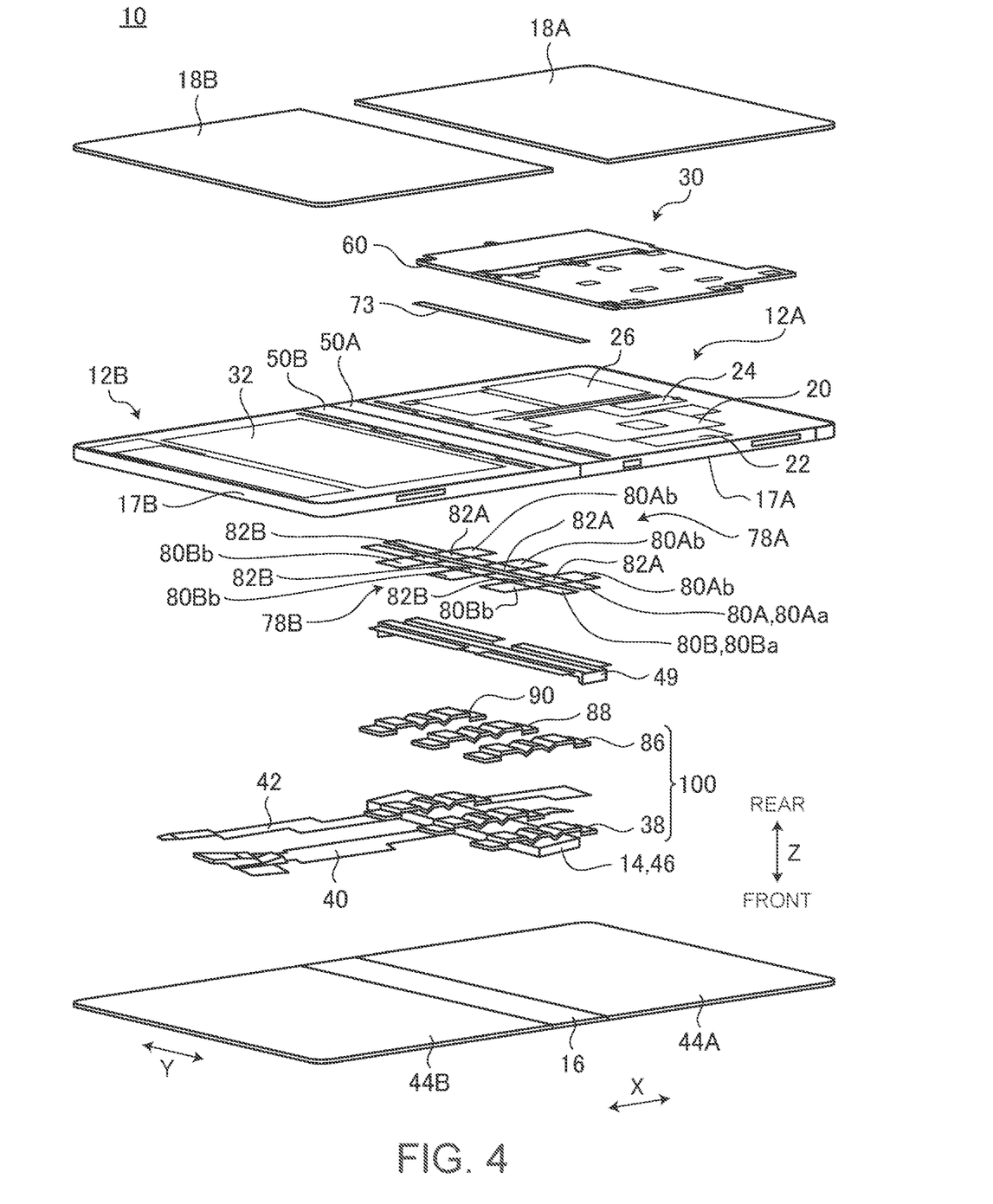
FIG. 4 is an exploded perspective view of the electronic apparatus.
Figure 5:
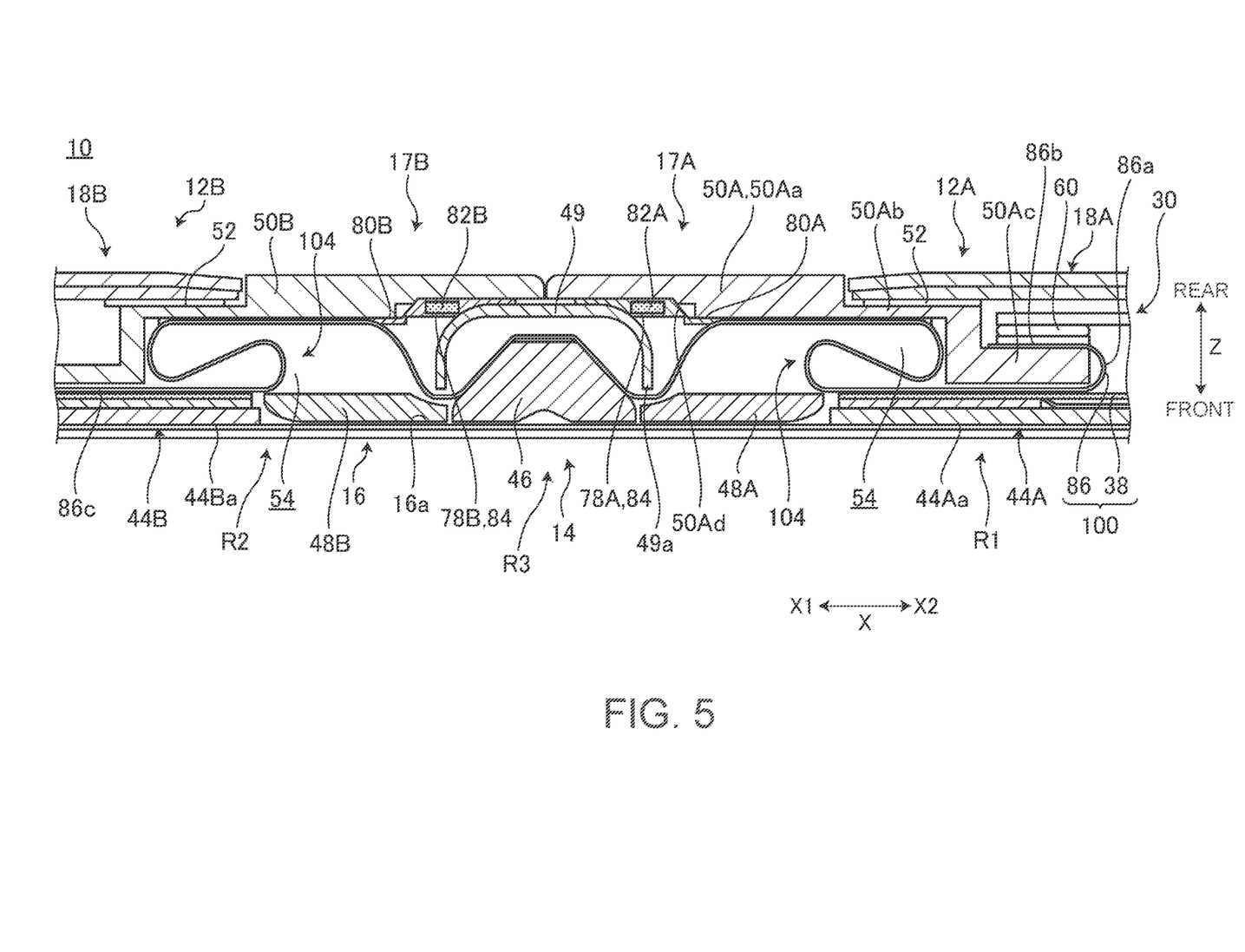
FIG. 5 is a cross-sectional side view of a hinge device and the periphery thereof in the 180-degree posture.
Figure 6:
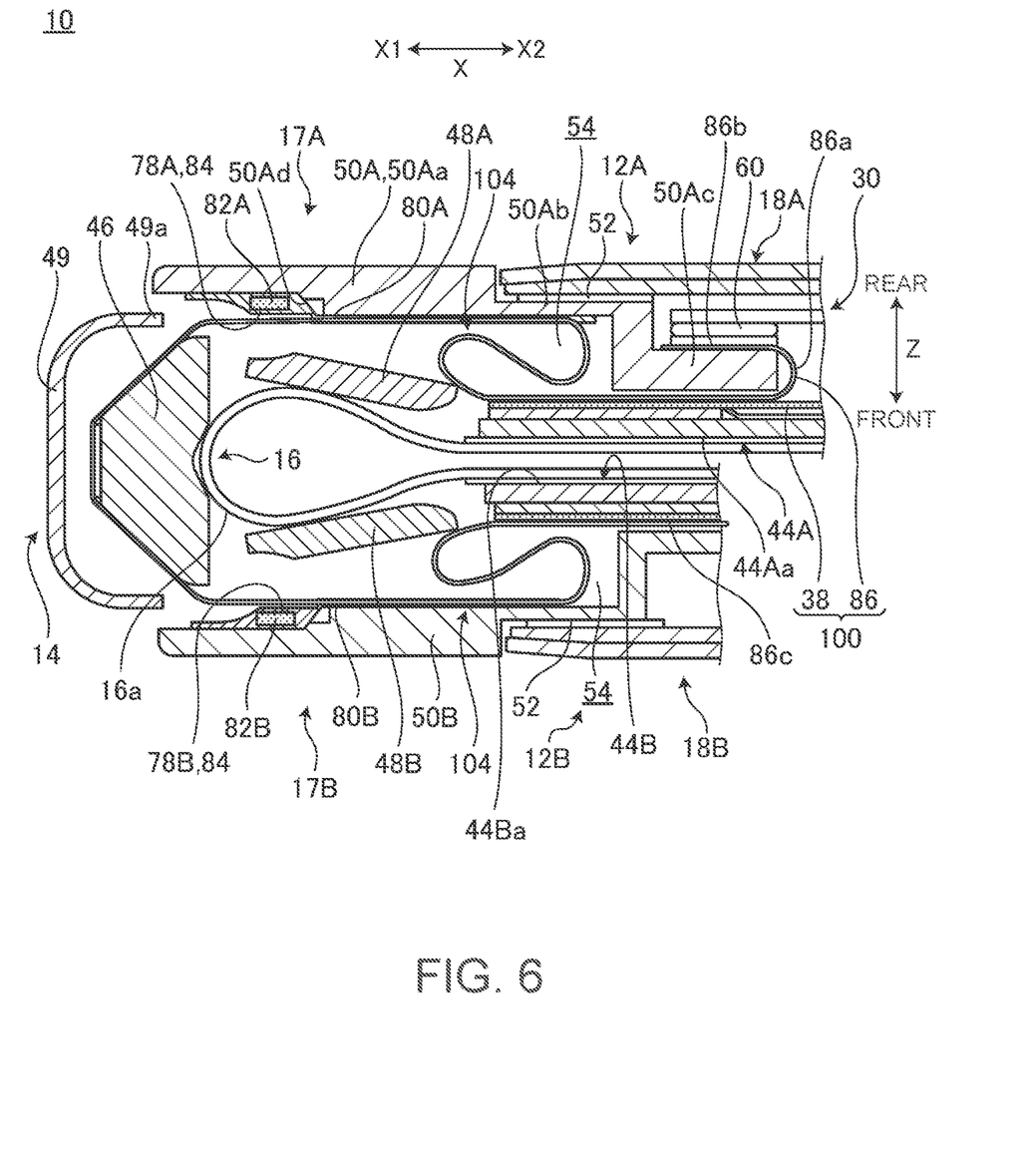
FIG. 6 is a cross-sectional side view of the hinge device and the periphery thereof in the 0-degree posture.

FIG. 1 is a perspective view illustrating a state in which an electronic apparatus 10 according to an embodiment is closed and in a 0-degree posture. FIG. 2 is a plan view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2. In FIG. 3, cover members 18A and 18B and a thermal module 30 are removed. FIG. 4 is an exploded perspective view of the electronic apparatus 10. FIG. 5 is a cross-sectional side view of a hinge device 14 and the periphery thereof in the 180-degree posture. FIG. 6 is a cross-sectional side view of the hinge device 14 and the periphery thereof in the 0-degree posture.

As illustrated in FIGS. 1 to 4, the electronic apparatus 10 includes a first chassis 12A, a second chassis 12B, the hinge device 14, and a display 16. The display 16 extends between the chassis 12A and 12B. In the present embodiment, the electronic apparatus 10 exemplifies a tablet PC or a laptop PC that can be folded like a book. The electronic apparatus 10 may have a configuration in which two chassis are relatively and rotatably connected.

The chassis 12A and 12B are disposed adjacent to each other. The first chassis 12A includes a frame member 17A and the cover member 18A. The frame member 17A is a rectangular frame-shaped member forming standing walls formed on three sides other than a first end portion 12Aa adjacent to the second chassis 12B. The cover member 18A is a plate-shaped member that closes a rear surface opening of the frame member 17A (see also FIG. 5). Similarly, the second chassis 12B includes a frame member 17B forming standing walls on three sides other than a second end portion 12Ba adjacent to the first chassis 12A, and the cover member 18B that closes a rear surface opening of the frame member 17B. Front surface openings of the frame members 17A and 17B are closed with the display 16.

Each of the members 17A, 17B, 18A, and 18B is made of, for example, a metal member such as stainless steel, magnesium, or aluminum, or a fiber-reinforced resin plate containing reinforcing fibers such as carbon fiber, and the like. That is, the members 17A, 17B, 18A, and 18B are heat conductive materials and have appropriate heat transfer properties.

The hinge device 14 relatively and rotatably connects the chassis 12A and 12B in an angular posture between the 0-degree posture and the 180-degree posture. The hinge device 14 also functions as a rear cover that hides a gap between the end portions 12Aa and 12Ba formed in the 0-degree posture illustrated in FIG. 1.

Hereinafter, as for the electronic apparatus 10, description is made in which the direction in which the chassis 12A and 12B are aligned is called an X direction, the direction along the end portions 12Aa and 12Ba orthogonal to the X direction is called a Y direction, and the thickness direction of the chassis 12A and 12B is called a Z direction. In the Z direction, the side where the display 16 is provided is a front surface, and a side where the cover members 18A and 18B are provided is a rear surface. In addition, only for the first chassis 12A and components thereof, the direction of the end portion 12Aa in the X direction is an X1 side, and the opposite side thereof is an X2 side.

Furthermore, as for an angular posture between the chassis 12A and 12B, description is made in which a state where the chassis 12A and 12B are stacked so as to overlap each other in a surface normal direction is called the 0-degree posture (see FIG. 1), and a state where the chassis 12A and 12B are aligned in a direction perpendicular to the surface normal direction (X direction) is called the 180-degree posture (see FIGS. 2 and 3). It is possible to call the posture between 0 and 180 degrees by appropriately carving the angle. For example, a state in which the surface normal directions of the chassis 12A and 12B are orthogonal to each other is a 90-degree posture. These angles are for convenience of description, and the actual product may of course have angular positions slightly deviated from the exact angular positions indicated by angle numbers.

As illustrated in FIG. 3, the first chassis 12A is equipped with a motherboard 20, a communication module 22, a solid state drive (SSD) 24, and a battery device 26. The thermal module 30 (see FIG. 4) is provided in the first chassis 12A.

The thermal module 30 is a heat radiation element that receives the heat from a CPU 20a, the communication module 22, and the SSD 24, which are electrical components generating heat, to disperse the heat over a wide range and radiate the heat, and includes a vapor chamber, a graphite sheet, and one or more heat pipes. As illustrated by a reference sign 60 in FIG. 4, one of the heat pipes is provided along an edge of the thermal module 30 on the X1 side so that the heat of the heating element is transferred to a heat pipe 60.

The motherboard 20 is mounted with an electronic component, for example, a central processing unit (CPU) 20a and the like. The CPU 20a is a processing device that performs computing related to primary control or processing of the electronic apparatus 10. The CPU 20a is the largest heating element among the electronic components mounted in the electronic apparatus 10. The communication module 22 performs information processing on wireless communication transmitted and received, for example, via an antenna mounted on the second chassis 12B. The communication module 22 corresponds to, for example, a wireless WAN or a 5th generation mobile communication system. The SSD 24 is a storage device that uses a semiconductor memory. The first chassis 12A is mounted with various electronic components other than the motherboard 20. The communication module 22 and the SSD 24 are heating elements having the heat generation amount only next to the CPU 20a. The battery device 26 is a secondary battery that serves as a sub-power source for the electronic apparatus 10.

The second chassis 12B is mounted with a battery device 32, a display board 34, and a sub card 36. The battery device 32 is a secondary battery that serves as the main power source of the electronic apparatus 10, is larger than the battery device 26, and occupies most of the second chassis 12B. The display board 34 is a control board of the display 16. The sub card 36 is a board on which, for example, a power button, an external connector conforming to a universal serial bus (USB) standard, and the like are mounted. The second chassis 12B is mounted with various electronic components other than the battery device 32 and the like.

The battery device 32, the display board 34, and the sub card 36 are connected to the motherboard 20 using flexible boards 38, 40, and 42 while straddling the end portions 12Aa and 12Ba, respectively. Hereinafter, the flexible boards 38, 40, and 42 will be typically referred to as the flexible boards 38 unless otherwise particularly distinguished.

The amount of heat generated by the battery device 32, the display board 34, and the sub card 36 is smaller than that of the CPU 20a or the like. Therefore, in the electronic apparatus 10, the amount of heat generated in the first chassis 12A is larger than the amount of heat generated in the second chassis 12B. Therefore, the electronic apparatus 10 has a configuration to equalize heat of each of the chassis 12A and 12B by promoting heat transfer between the left and right chassis 12A and 12B, and includes heat conductive members 78A and 78B (see FIG. 4) and graphite sheets 86, 88, and 90 (see FIG. 4). The graphite sheets 86, 88, and 90 are sequentially stacked and bonded to a part of the flexible boards 38, 40, and 42. These heat conductive members 78A and 78B and graphite sheets 86, 88, and 90 will be described below.

In the 0-degree posture illustrated in FIGS. 1 and 6, the chassis 12A and 12B are folded in two. The display 16 is a paper-like flexible display formed of an organic EL. In the 0-degree posture, the display 16 is disposed such that a region R1 on the first chassis 12A side faces a region R2 on the second chassis 12B side illustrated in FIG. 2, and a bending region R3, which is a boundary region between the regions R1 and R2, is bent in an arc shape. In the 180-degree posture illustrated in FIGS. 2 and 5, the chassis 12A and 12B are disposed side by side with each other. In this case, the display 16 has the regions R1 and R2 and the bending region R3 disposed side by side on an XY plane, and forms a flat plate shape as a whole.

In the display 16, the region R1 is relatively fixed to the first chassis 12A, and the region R2 is relatively fixed to the second chassis 12B. Specifically, as illustrated in FIG. 5, a rear surface 16a of the region R1 is fixed to the first chassis 12A via a first plate 44A, and a rear surface 16a of the region R2 is fixed to the second chassis 12B via a second plate 44B.

As illustrated in FIG. 5, the plates 44A and 44B are disposed on the left and right so as to interpose the hinge device 14 therebetween, and support the display 16 with the respective front surfaces 44Aa and 44Ba. The rear surface 16a of the display 16 has the region R1 adhesively fixed to the front surface 44Aa of the first plate 44A and the region R2 adhesively fixed to the front surface 44Ba of the second plate 44B. The plates 44A and 44B have a configuration in which a metal frame made of a magnesium alloy surrounds a carbon fiber reinforced resin plate in which carbon fibers are impregnated with a matrix resin such as epoxy resin and an outer periphery of the rear surface of the carbon fiber reinforced resin plate.

The bending region R3 of the display 16 is relatively movable with respect to the chassis 12A and 12B. In the 180-degree posture, the rear surface 16a of the bending region R3 is supported by the hinge device 14 (see FIG. 5). In the 0-degree posture, the bending region R3 is bent in an arc shape, a part of the rear surface 16a is supported by the hinge device 14, and most of the rear surface 16a is separated from the hinge device 14 (see FIG. 6).

As illustrated in FIGS. 5 and 6, the hinge device 14 of the present embodiment has a hinge main body (hinge) 46, a first support plate 48A, and a second support plate 48B.

The hinge main body 46 is provided at a position straddling the end portions 12Aa and 12Ba of the chassis 12A and 12B, and extends over the substantially entire length in the Y direction along the end portions 12Aa and 12Ba. The cross-section of the hinge main body 46 is symmetrical between the first chassis 12A and the second chassis 12B, and has a trapezoidal shape due to the two inclined surfaces 46a and the top surface 46b between the two inclined surfaces 46a. The hinge main body 46 is a block-shaped component formed of a metal material such as aluminum. The hinge main body 46 supports two hinge shafts aligned in the X direction in the 180-degree posture.

As illustrated in FIGS. 1 and 5, a rear cover component 49 is attached to an outer surface of the hinge main body 46. The rear cover component 49 is a substantially U-shaped plate that matches an outer surface shape of the hinge main body 46. The rear cover component 49 is formed of a heat conductive material, for example, an aluminum alloy, stainless steel, or the like. The rear cover component 49 is a decorative cover for improving the outer surface quality. The flexible boards 38, 40, and 42 pass between the hinge main body 46 and the rear cover component 49 at the position straddling the end portions 12Aa and 12Ba.

In the 180-degree posture illustrated in FIG. 5, the hinge main body 46 is accommodated in the chassis 12A and 12B, and straddles the end portions 12Aa and 12Ba close to each other in the X direction. In the 0-degree posture illustrated in FIG. 6, the hinge main body 46 is disposed so as to close a gap formed between the end portions 12Aa and 12Ba which are largely separated from each other. In this case, deterioration of an appearance design of the folded electronic apparatus 10 is prevented by disposing the rear cover component 49 to the outermost surface (see FIG. 1).

That is, the rear cover component 49 covers the gap formed between the chassis 12A and 12B in an angular posture other than the 180-degree posture (for example, the 0-degree posture or the 90-degree posture) (see FIGS. 1 and 6). As a result, the rear cover component 49 is prevented from exposing the internal components of the chassis 12A and 12B from the gap to an appearance. The rear cover component 49 is disposed so as to straddle the end portions 12Aa and 12Ba close to each other in the X direction in the 180-degree posture, and is accommodated in the chassis 12A and 12B (see FIG. 5).

Next, the support plates 48A and 48B are plates formed of a metal material such as aluminum, and have bilateral symmetrical shapes. The support plates 48A and 48B are provided on a front side of the chassis 12A and 12B, and extend over the substantially entire length in the Y direction along the end portions 12Aa and 12Ba.

The first support plate 48A is disposed between the first plate 44A and the hinge main body 46. The first support plate 48A has an edge portion on a side of the first plate 44A, which is relatively and rotatably connected to a predetermined bracket via a rotation axis. The first support plate 48A has an edge portion on a side of the hinge main body 46, which is relatively movable with respect to the hinge main body 46. Since the configuration, the mounting structure, and the like of the second support plate 48B are bilaterally symmetrical with those of the first support plate 48A, detailed description thereof will be omitted.

The support plates 48A and 48B swing according to a rotation operation of the chassis 12A and 12B. In the 180-degree posture, the support plates 48A and 48B support the rear surface 16a of the bending region R3 of the display 16 on the front surfaces thereof. In the angular postures other than 180 degrees, the support plates 48A and 48B come into contact with the display 16 in a state in which a gap is provided therebetween and the display 16 or with a slight force that does not deform the display 16 (see FIG. 6). The support plates 48A and 48B may be configured to support the bending region R3 of the display 16 even in an angular posture other than 180 degrees and to correct the shape of the bending region R3. As described above, in the 180-degree posture, the support plates 48A and 48B stably support the bending region R3 of the display 16 in a plane, and the support plates 48A and 48B do not hinder a bending operation of the bending region R3.

A connecting edge portion 50A along the end portion 12Aa of the frame member 17A will be described. The connecting edge portion 50A is substantially symmetrical with and adjacent to the connecting edge portion 50B in the X direction along the end portion 12Ba of the frame member 17B in the 180-degree posture (see FIG. 5). In addition, the connecting edge portion 50A and the connecting edge portion 50B are almost symmetrical in the Z direction and face each other in the 0-degree posture (see FIG. 6). Since the connecting edge portion 50A and the connecting edge portion 50B have substantially symmetrical shapes, only the connecting edge portion 50A will be described.

The connecting edge portion 50A is a part of the frame member 17A and has appropriate heat transfer properties as described above. The connecting edge portion 50A includes a rear surface forming portion 50Aa, a middle stage portion 50Ab, and a low stage portion 50Ac. The rear surface forming portion 50Aa is a part that forms the rear surface of the first chassis 12A in a region between the end portion 12Aa of the cover member 18A and the end portion 12Aa of the first chassis 12A. A low step portion 50Ad is formed on an inner surface of the rear surface forming portion 50Aa on the X1 side.

The middle stage portion 50Ab is a part extending to the X2 side from the rear surface forming portion 50Aa. The cover member 18A is fixed to the middle stage portion 50Ab by an adhesive tape 52. There is a step between the rear surface forming portion 50Aa and the middle stage portion 50Ab, and the rear surface forming portion 50Aa and the cover member 18A have substantially the same surface as each other.

The low stage portion 50Ac is a part that slightly shifts from the middle stage portion 50Ab to the front surface side and extends to the X2 side. A part of the thermal module 30 is fixed to the low stage portion 50Ac. In FIG. 5, a space 54 is formed on the front surface side of the middle stage portion 50Ab and on the X1 side of the low stage portion 50Ac. A part of the flexible board 38 is accommodated in the space 54 so as to draw an inverted S shape. In addition, there is a similar space at symmetrical positions of the second chassis 12B, and a part of the flexible board 38 is accommodated so as to draw an S shape. Thus, the flexible board 38 can follow the electronic apparatus 10 without difficulty in response to its deformation from the 0-degree posture to the 180-degree posture. The details of this part will be further described below.

As illustrated in FIGS. 4 and 5, the electronic apparatus 10 includes a first heat conductive member 78A provided in the first chassis 12A and a second heat conductive member 78B provided in the second chassis 12B. The first heat conductive member 78A has a graphite sheet 80A and a cushion member 82A. The second heat conductive member 78B has a graphite sheet 80B and a cushion member 82B. The heat conductive members 78A and 78B are disposed in a substantially bilaterally symmetrical manner. The graphite sheets 80A and 80B and graphite sheets 73, 86, 88, and 90, which will be described below, are graphite sheets, which are allotrope of carbon, obtained by processing graphite into a sheet shape, and have high thermal conductivity. The graphite sheets 86, 88, and 90 are thin and flexible sheets having a thickness of, for example, about 10 μm to 1 mm. These graphite sheets may be replaced with sheet-like members formed of a heat conductive material such as a copper sheet or an aluminum sheet.

As illustrated in FIG. 4, the graphite sheets 80A and 80B include the sheets 80Aa and 80Ba extending in the Y direction and the three sheets 80Ab and 80Bb protruding in the X direction so as to be orthogonal to the sheets 80Aa and 80Ba. The sheet 80Aa is disposed along the end portion 12Aa, and the sheet 80Ba is disposed along the end portion 12Ba. The sheet 80Ab and the sheet 80Bb protrude in opposite directions.

The cushion members 82A and 82B are formed of a material having flexibility and a certain degree of repulsive force, such as rubber and sponge. The cushion members 82A and 82B of the present embodiment are sponges. The cushion members 82A and 82B are thicker than the graphite sheets 80A and 80B in the Z direction, for example, about 1 to 2 mm. The cushion members 82A and 82B are disposed at three intersections of the sheets 80Aa and 80Ba and the sheets 80Ab and 80Bb, respectively. Thus, the heat conductive members 78A and 78B have a bank-shaped swelling portion 84 formed at each position where the cushion members 82A and 82B are disposed, in which the graphite sheets 80A and 80B are raised.

The graphite sheet 80A is attached to the rear surface forming portion 50Aa of the connecting edge portion 50A and to a front surface side of the middle stage portion 50Ab. The cushion member 82A and the swelling portion 84 corresponding to the cushion member 82A are disposed on the step portion 50Ad. The graphite sheet 80B and the cushion member 82B are provided at positions of the connecting edge portion 50B, which are substantially symmetrical with the graphite sheet 80A and the cushion member 82A.

As illustrated in FIG. 5, the cushion members 82A and 82B have the graphite sheets 80A and 80B, which are pressed against the rear cover component 49 in the 180-degree posture. Therefore, the heat conductive members 78A and 78B are in contact with the rear cover component 49 at a part where the swelling portion 84 is present. Thus, the first frame member 17A is thermally connected to the second frame member 17B via the graphite sheet 80A, the rear cover component 49, and the graphite sheet 80B, so that heat is transferred between the first chassis 12A and the second chassis 12B. The swelling portion 84 abuts a shoulder portion of the rear cover component 49 so as not to deteriorate the front surface of the rear cover component 49 because a sliding distance with respect to the rear cover component 49 is short when the electronic apparatus 10 is deformed from 0 degrees to 180 degrees. As illustrated in FIG. 6, the graphite sheets 80A and 80B are separated from the rear cover component 49 in the 0-degree posture so as not to be visually recognized by the user.

Next, the graphite sheets 86, 88, and 90 will be described. As described above, the graphite sheets 86, 88, and 90 are sequentially stacked in the flexible boards 38, 40, and 42 at least a point from the first chassis 12A to the second chassis 12B, and are attached by a heat-transferable adhesive tape or the like. Hereinafter, the graphite sheet 86 and the flexible board 38, which are typically attached to each other, will be described. The graphite sheet 86 has a strip shape and has the same width as the flexible board 38 in the X direction. The graphite sheet 86 and the flexible board 38, which are attached to each other, are used as the stacked body 100.

As illustrated in FIG. 5, the graphite sheet 86 and the flexible board 38 are stacked at a point from the first chassis 12A to the second chassis 12B, and thus have the same routing route. Therefore, the stacked body 100 is accommodated so as to draw an S-shape and an inverted S-shape in the space 54 of the first chassis 12A and a corresponding space of the second chassis 12B. Further, since the graphite sheet 86 and the flexible board 38 are disposed in a path between the rear cover component 49 and the hinge device 14, the rear surface side is covered with the rear cover component 49 and is not visually recognized. In addition, the front surface side is covered with the display 16.

The stacked body 100 has a gap between the low stage portion 50Ac of the connecting edge portion 50A and the display 16, which extends in the X2 direction from the space 54 in the first chassis 12A. The flexible board 38 passing through the gap is connected to the motherboard 20. On the other hand, the graphite sheet 86 forms a U-shaped folding portion 86a, and one end portion 86b reaches a rear surface of the low stage portion 50Ac, is stacked and interposed between one end portion 86b and the low stage portion 50Ac via a heat-transferable rubber 72 by the heat pipe 60, and is thermally connected. That is, one end portion 86b of the graphite sheet 86 is thermally connected to the thermal module 30 and the connecting edge portion 50A. In the embodiment, one end portion 86b of the graphite sheet 86 is thermally connected by being interposed between the heat pipe 60 and the low stage portion 50Ac. However, when the thermal connection state thereof is maintained, the stacking order may be changed by, for example, changing the path of the graphite sheet 86 regardless of the stacking order of these three components.

Further, the stacked body 100 is disposed in the second chassis 12B while being substantially symmetrically with the inside of the first chassis 12A, and the other end portion 86c of the graphite sheet 86 is thermally connected to the frame member 17B, the connecting edge portion 50B, or the like, which is a part of the frame member 17B. Therefore, heat of the heating element, such as the CPU 20a, is transferred from the thermal module 30 to the heat pipe 60, which is the end portion thereof, and is transferred to one end portion 86b, which is stacked and interposed by the heat pipe 60 and the low stage portion 50Ac, so that heat is transferred from the first chassis 12A to the second chassis 12B by the graphite sheet 86.

Further, as described above, heat of the heat pipe 60 is transferred from the low stage portion 50Ac to the connecting edge portion 50A, the first heat conductive member 78A, the rear cover component 49, the second heat conductive member 78B, and the connecting edge portion 50B. Due to these effects, the electronic apparatus 10 can adjust temperature balance between the first chassis 12A and the second chassis 12B. In the first chassis 12A, the temperature rise is moderately suppressed, so that other cooling means such as a fan can be omitted. By omitting mechanical operation elements such as the fan, the cost can be reduced, the noise can be reduced, and the thickness can be reduced.

Hereinafter, the configuration and effect of the stacked body 100, which is disposed in the first chassis 12A and along the hinge main body 46, will be further described. Since the aspect of the inside of the second chassis 12B of the stacked body 100 is substantially symmetrical with the inside of the first chassis 12A, the description thereof will be omitted.

Figure 7:
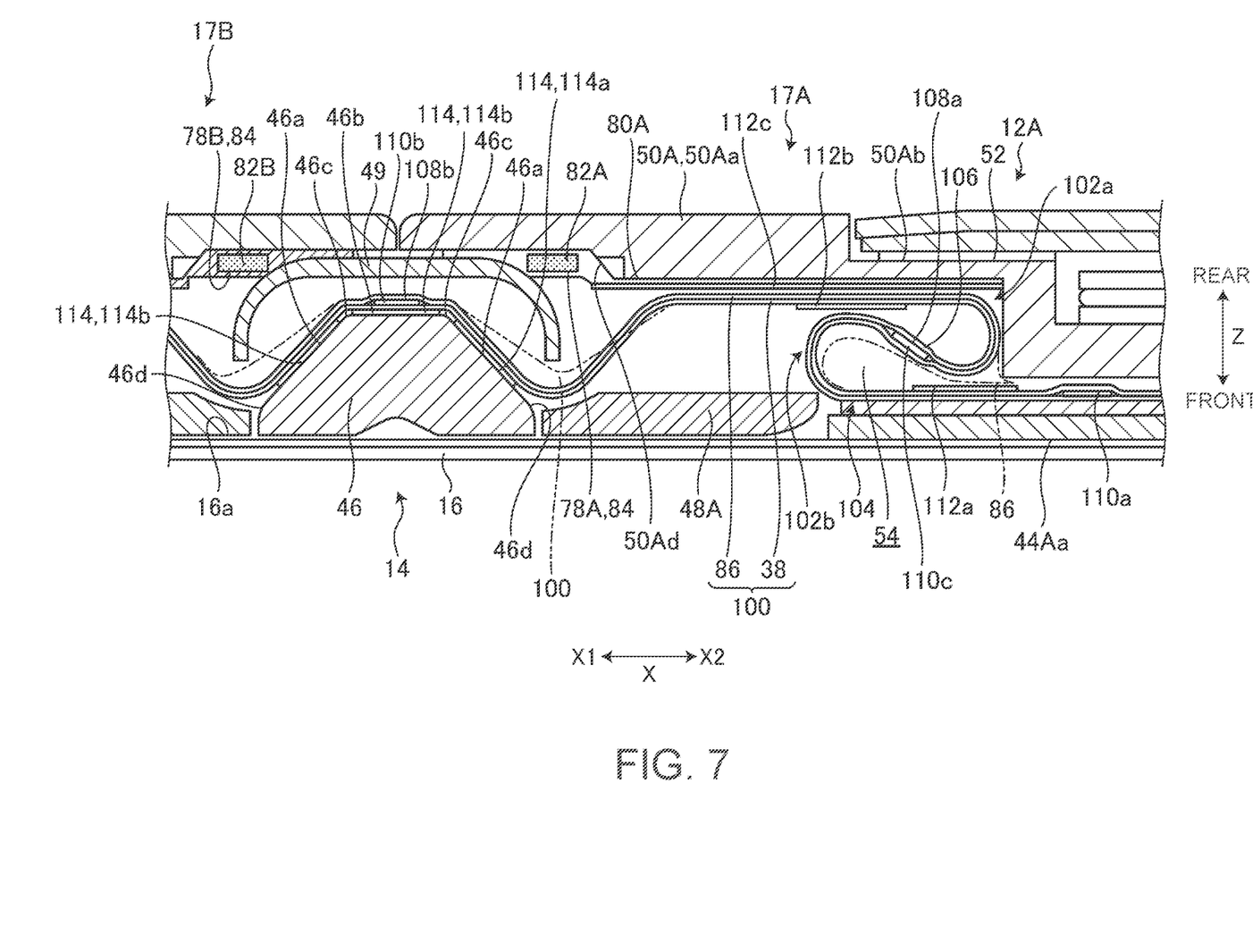
FIG. 7 is a cross-sectional side view illustrating a state of a stacked body provided in a space and along a hinge main body in the 180-degree posture.
Figure 8:
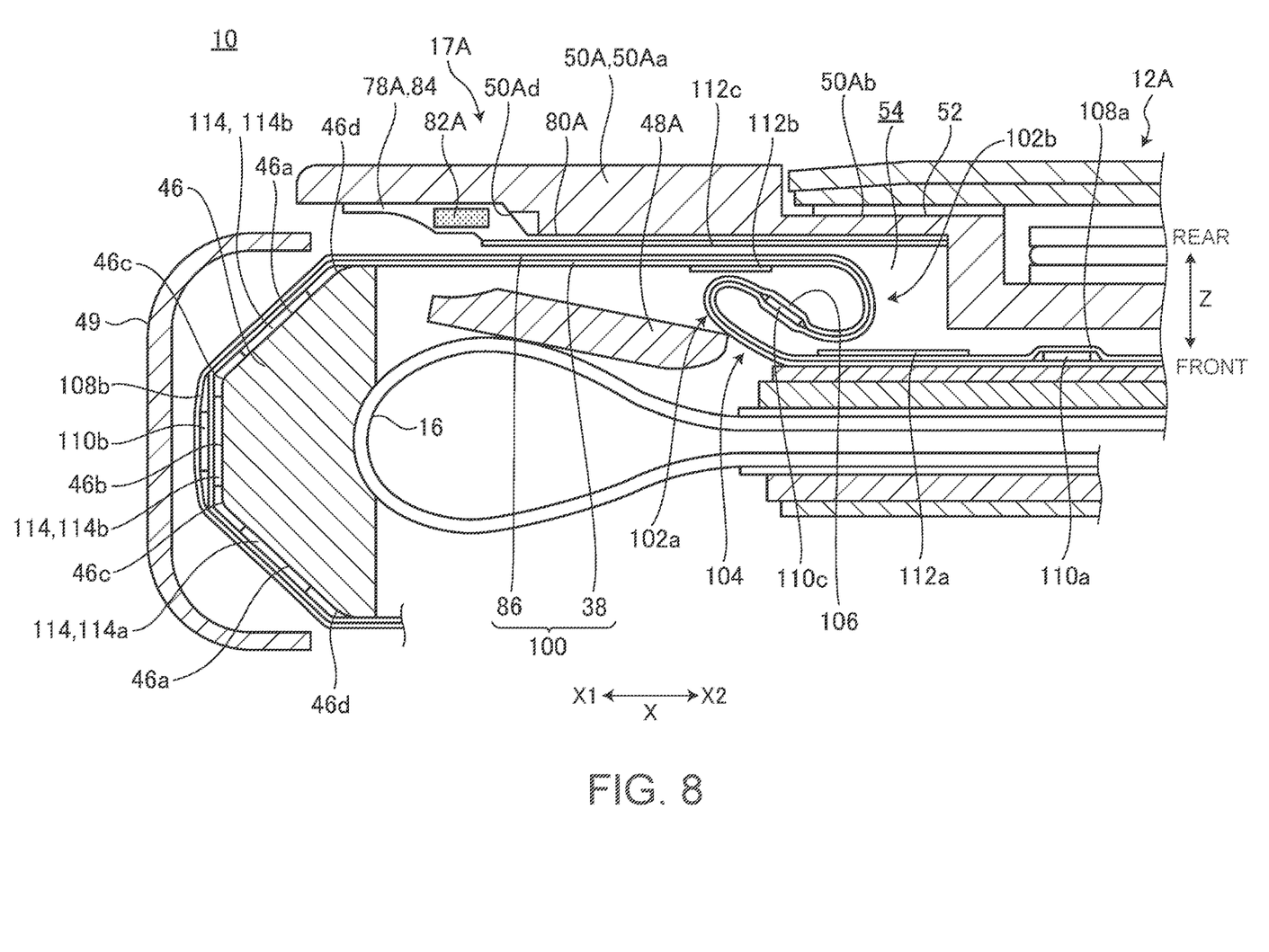
FIG. 8 is a cross-sectional side view illustrating a state of the stacked body provided in the space and along the hinge main body in the 0-degree posture.

FIG. 7 is a cross-sectional side view illustrating a state of the stacked body 100 which is disposed in the space 54 and along the hinge main body 46 in the 180-degree posture. FIG. 8 is a cross-sectional side view illustrating a state of the stacked body 100 which is disposed in the space 54 and along the hinge main body 46 in the 0-degree posture.

In the space 54 in the first chassis 12A, the stacked body 100 forms a substantially S-shaped extra length absorption portion 104 having a first folding portion 102a and a second folding portion 102b which are arranged side by side and curved in opposite directions. The first folding portion 102a, which serves as the X1 side, and the second folding portion 102b, which serves as the X2 side, have a so-called hairpin curve shape.

In the stacked body 100, the path length becomes longer because the inclined surface 46a is slightly separated from the space 54 in the 0-degree posture (see FIG. 8), as compared to a case where the path length becomes short if necessary because the inclined surface 46a of the hinge main body 46 is slightly close to the space 54 in the 180-degree posture (see FIG. 7). In response to the deformation from the 0-degree posture to the 180-degree posture of the electronic apparatus 10, the stacked body 100 is followed by the extra length absorption portion 104 without difficulty. That is, the extra length absorption portion 104 is slightly larger in the 180-degree posture, but slightly smaller in the 0-degree posture.

In the present embodiment, the stacked body 100 has a V-shape at the front and rear of the edge portion 49a of the rear cover component 49 in the 180-degree posture, whereas the V-shape disappears in the 0-degree posture. Since the V-shape corresponds to the loosening of the stacked body 100, the extra length absorption portion 104 has an effect of absorbing the extra length.

In the 180-degree posture, the extra length absorption portion 104 has a slightly large S-shape, and the first folding portion 102a and the second folding portion 102b have a shape substantially point-symmetrical with the intermediate portion 106 between the first folding portion 102a and the second folding portion 102b. The stacked body 100 is curved clockwise at the first folding portion 102a toward the second chassis 12B from the first chassis 12A, and is curved counterclockwise at the second folding portion 102b. That is, the intermediate portion 106 includes an inflection point. In this case, the inflection point is not limited to a predetermined point, and includes a linear case. In the 180-degree posture, the extra length absorption portion 104 forms a slightly large S-shape, and the intermediate portion 106 is substantially linear.

In the 0-degree posture, the extra length absorption portion 104 forms a slightly small S-shape, and has slightly different shape from the first folding portion 102a and the second folding portion 102b, which are slightly distorted due to the influence of the support plate 48A or the like. Even when the extra length absorption portion 104 is slightly distorted, a part including the inflection point in the intermediate portion 106 forms a straight line although it is short.

In the flexible board 38 and the graphite sheet 86 of the stacked body 100, the front stage fixing point 108a and the rear stage fixing point 108b are fixed to each other by the adhesive tapes 110a and 110b. The rear stage fixing point 108b is common to each of the extra length absorption portions 104 in the first chassis 12A and the second chassis 12B. The front stage fixing point 108a is a point that is located at a front stage of the extra length absorption portion 104, and specifically, a point that faces the low stage portion 50Ac on the X2 side from the space 54, based on a direction from the first chassis 12A toward the second chassis 12B. The rear stage fixing point 108b is a point that is located at a rear stage of the extra length absorption portion 104, that is, at a point facing the top surface 46b of the hinge main body 46. As described above, since in the stacked body 100, the flexible board 38 and the graphite sheet 86 are fixed to each other at the front and rear of the extra length absorption portion 104, positions thereof are not deviated from each other even if the shape of the extra length absorption portion 104 changes.

Further, the flexible board 38 and the graphite sheet 86 are fixed to each other by an adhesive tape 110c in the intermediate portion 106. That is, the intermediate portion 106 is a middle stage fixing portion. The adhesive tape 110c may be provided at least at a point including the inflection point of the first folding portion 102a and the second folding portion 102b in the angular posture from the 0-degree posture to the 180-degree posture. As described above, when the flexible board 38 and the graphite sheet 86 are fixed to each other at the front and rear of the extra length absorption portion 104 and at the intermediate portion 106, the S-shape is maintained in both the flexible board 38 and the graphite sheet 86. As a result, the flexible board 38 and the graphite sheet 86 are not separated in the extra length absorption portion 104, and for example, as indicated by a virtual line in FIG. 7, the graphite sheet 86 does not touch a corner portion of the low stage portion 50Ac or is not fitted between the low stage portion 50Ac and the first plate 44A. Therefore, it is possible to prevent contacting and sliding of the graphite sheet 86 and structures thereof by rotation of the first chassis 12A and the second chassis 12B, thereby preventing occurrence of abnormal noise. Since the front surface of the graphite sheet 86 is relatively rough, it is conceivable that sliding noise is likely to occur during sliding, but as described above, abnormal noise is prevented from occurring due to fixation of the intermediate portion 106 with the adhesive tape 110c.

Since the extra length absorption portion 104 is fixed to only the intermediate portion 106 between the first folding portion 102a and the second folding portion 102b by the adhesive tape 110c, excluding the first folding portion 102a and the second folding portion 102b, the thickness of the first folding portion 102a and second folding portion 102b is suppressed, and slight deviation of the flexible board 38 and the graphite sheet 86 due to a curvature change is allowed, so that the S-shape is easily deformed into a large and small size, and an extra length of the stacked body 100 is easily absorbed.

The intermediate portion 106 is a point where there is almost no change in curvature when the S-shape is deformed into a large and small size, and is suitable as a point where the flexible board 38 and the graphite sheet 86 are fixed. In addition, since the intermediate portion 106 is a linear point that includes an S-shaped inflection point, is not bent during stationary, and has no change in curvature even during the operation, it is possible to reliably fix the flexible board 38 and the graphite sheet 86 without peeling.

In the present embodiment, as indicated by the virtual line in FIG. 7, the graphite sheet 86 is mainly prevented from contacting and sliding with other structures, but when the flexible board 38 and the graphite sheet 86 are reversely stacked in the stacked body 100, the flexible board 38 is prevented from contacting the sliding with the other structures. Generally, the flexible board 38 has a smoother front surface than the graphite sheet 86, but there is a concern that some sliding noise occurs, and abnormal noise is prevented from occurring due to fixation of the intermediate portion 106 with the adhesive tape 110c.

The space 54 in which the extra length absorption portion 104 is formed is not limited to the point illustrated in FIGS. 7 and 8, and may be other points inside the first chassis 12A. The extra length absorption portion 104 is provided in both the first chassis 12A and the second chassis 12B, but for example, when a display chassis, which includes a main body chassis with a keyboard and a display, is a laptop PC that is configured rotatably by the hinge, the extra length absorption portion 104 may be provided only in the main body chassis. In other words, the flexible board 38 and the graphite sheet 86 may form the extra length absorption portion 104 in at least one of the two chassis according to design conditions, and may be fixed to each other by the S-shaped intermediate portion 106. When it is less necessary for heat transfer between the first chassis 12A and the second chassis 12B and more signal lines, the stacked body 100 may be configured by stacking another flexible board (sheet) on the flexible board 38 instead of the graphite sheet 86.

Further, in the electronic apparatus 10 according to the present embodiment, the stacked body 100 of the flexible board 38 and the graphite sheet 86 has sliding sheets 112a and 112b provided at the front and rear of the extra length absorption portion 104 at a point facing the first folding portion 102a and the second folding portion 102b.

The sliding sheet 112a is attached to the front surface of the graphite sheet 86 on a front stage side, and the sliding of the second folding portion 102b with the graphite sheet 86 is smoothed to suppress friction noise occurred between the second folding portion 102b and the graphite sheet 86. When the graphite sheets 86 are slid against each other, sliding noise is likely to occur, but abnormal noise can be suppressed by interposing the sliding sheet 112a therebetween.

The sliding sheet 112b is attached to the front surface of the flexible board 38 on a rear stage side, and the sliding of the first folding portion 102a with the flexible board 38 is smoothed to suppress friction noise occurred between the first folding portion 102a and the flexible board 38. The sliding noise between the flexible boards 38 is smaller than the sliding noise between the graphite sheets 86, but abnormal noise can be further suppressed by interposing the sliding sheets 112b between the flexible boards 38.

Since the sliding sheets 112a and 112b are not provided on the folding portions 102a and 102b having a change in shape, and are provided on the chassis side having no change in curvature, the sliding sheets 112a and 112b are less likely peeled off, so that the change in shape of the folding portions 102a and 102b is not hindered.

A sliding sheet 112c is provided on the graphite sheet 80A of the first heat conductive member 78A over the substantially entire length. The sliding sheet 112c is interposed between the graphite sheet 80A and the graphite sheet 86 of the stacked body 100 to suppress friction noise occurring therebetween.

The sliding sheets 112a to 112c are sheets with excellent sliding properties and wear resistance, and are, for example, Teflon (registered trademark) (i.e., polytetrafluoroethylene). Although not illustrated, for example, as fixing means of the sliding sheets 112a to 112c, an adhesive tape may be used.

Furthermore, in the electronic apparatus 10 according to the present embodiment, the stacked body 100 is fixed to two trapezoidal inclined surfaces 46a formed by the hinge main body 46 and the top surface 46b provided between the two trapezoidal inclined surfaces 46a, by adhesive tapes 114. Each of the three adhesive tapes 114 is provided at a part except for the trapezoidal corner portion 46c, and is discontinuous. In FIG. 7, among the adhesive tapes 114, the reference sign 114a is added to an adhesive tape that is attached to the inclined surface 46a, and the reference sign 114b is added to an adhesive tape that is adhered to the top surface 46b.

The stacked body 100 has flexibility and some bending rigidity, and has a linear shape in an initial state before assembly to the electronic apparatus 10, and after assembly, a slight elastic force is generated in a point facing the corner portion 46c to return to the straight line. In contrast, since the stacked body 100 is fixed to the hinge main body 46 by the adhesive tape 114 so as to be discontinuous at the corner portion 46c, the thickness and the bending rigidity of the point facing the corner portion 46c are suppressed, thereby maintaining the suitable flexibility. Therefore, the stacked body 100 is adhesively fixed to the trapezoidal hinge main body 46 without difficulty along one inclined surface 46a to the top surface 46b to the other inclined surface 46a, and is not peeled off.

Further, in the electronic apparatus 10, the chassis 12A and 12B rotate in the angular posture between the 0-degree posture and the 180-degree posture, so that the stacked body 100 has repeated bending stress at a point facing a skirt portion 46d of the hinge main body 46. If the stacked body 100 is fixed to a part including the point facing the corner portion 46c by the adhesive tape 114, the thickness and rigidity are increased to generate a force to peel off in the part, and the bending stress of the skirt portion 46d acts synergistically, so that there is a concern that the stacked body 100 is peeled off from the inclined surface 46a as indicated by the virtual line in FIG. 7. Then, the stacked body 100 is in a state of being fixed to the hinge main body 46 only by the adhesive tape 114b, and abnormal noise occurs by repeatedly contacting with and separating from the inclined surface 46a or the rear cover component 49. In the present embodiment, the stacked body 100 is not peeled off at the point facing the corner portion 46c as described above, and no abnormal noise occurs.

When the stacked body 100 is not fixed to the hinge main body 46 at the point facing the corner portion 46c, the adhesive tape 114a of the inclined surface 46a is prevented from being peeled off, so that the adhesive tape 114b of the top surface 46b may be omitted. However, the stacked body 100 is further reliably fixed by the adhesive tape 114b, and positioning with respect to the hinge main body 46 becomes easy in assembly.

The present invention is not limited to the above-described embodiment, and there is no doubt that the present invention can be freely changed without departing from the gist of the present invention.

The invention claimed is:

1. An electronic apparatus in which a first chassis and a second chassis are rotatably connected by a hinge, the electronic apparatus comprising:
   a flexible board between the first chassis and the second chassis; and
   a sheet between the first chassis and the second chassis together with the flexible board, wherein the sheet is stacked on the flexible board, wherein the sheet and the flexible board form a stacked body,
   wherein the flexible board and the sheet have a substantially S-shaped extra length absorption portion in at least one of the first chassis and the second chassis and further have a first folding portion and a second folding portion, both of which are curved in directions opposite to each other, and both of which are fixed to each other at a front and a rear of the extra length absorption portion, and both of which are fixed to each other at an intermediate portion between the first folding portion and the second folding portion,
   wherein the stacked body includes a sliding sheet at a point where the stacked body faces the first folding portion at the front and rear of the extra length absorption portion and at a point where the stacked body faces the second folding portion.

2. The electronic apparatus according to claim 1, wherein the sheet is a graphite sheet or a metal sheet.

3. The electronic apparatus according to claim 1, wherein the sliding sheet is polytetrafluoroethylene.

4. The electronic apparatus according to claim 1, wherein the hinge has a trapezoidal cross-section that is symmetrical between the first chassis and the second chassis, and
   the stacked body is at a point excluding a corner portion of each of two trapezoidal inclined surfaces of the hinge.

5. The electronic apparatus according to claim 4, wherein the stacked body is fixed by an adhesive to a top surface of the hinge and is between the two inclined surfaces of the hinge.

\* \* \* \* \*